Patented Dec. 2, 1952

2,620,341

UNITED STATES PATENT OFFICE 2,620,341

N,N-DIALKYL-QUINOLINE-4-CARBOXAMIDINES

Richard Baltzly, New York, and Emil Lorz, Yonkers, N. Y., assignors to Burroughs Wellcome & Co. (U. S. A.) Inc., Tuckahoe, N. Y., a corporation of New York No Drawing. Application March 24, 1949, Serial No. 83,292

4 Claims. (Cl. 260—288)

The present invention relates to a new group of chemical compounds and more particularly to a new type of substituted amidines which possess outstanding properties as local anesthetics in veterinary medicine. Some of the new compounds are particularly efficient as surface anesthetics, while others have been found to be valuable as injection anesthetics. At least some of the new compounds are also believed to be suitable for application in human medicine, but at present the clinical tests on these compounds have not been completed.

The new compounds are readily prepared in excellent yield by the methods disclosed in our co-pending U. S. application Serial No. 700,366, now abandoned, of which the present application is a continuation in part.

The physiologically active compounds according to the present invention, may be graphically represented by the formula

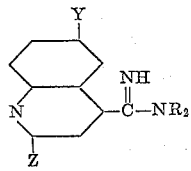

in which R is a member of the group consisting of the alkyl radicals and the cycloalkyl radicals having from 2 to 8 carbon atoms, Y is a member of the group consisting of hydrogen and chlorine and Z is a member of the group consisting of hydrogen and the butoxy radicals, at least one of the groups Y and Z being hydrogen, and the entire compound containing from 18 to 26 carbon atoms.

The limitations expressed in the above formula relate not to chemical but to physiological properties. For example, where Y and Z are hydrogen and R is an alkyl, the maximum potency is found with R=n-hexyl. Again, where Z is an alkoxy group or Y is chlorine the optimal size for R is affected. Probably there is an upper limit in size for a molecule of this type in respect to local anesthetic potency and this limit lies in the region of 20–26 carbon atoms.

The substances described in this application have been tested for general toxicity (on mice), as surface anesthetics (by the guinea pig cornea method) and as injection anesthetics (by the guinea pig wheal method). Potencies vary and frequently a substance according to the invention exhibits outstanding activity in one type of local anesthesia while being relatively inactive in the other. Results for three of the more potent substances are shown in the following table (LD$_{50}$ for cocaine is 103 mg./kg.)

| | Anesthetic Potency | | |
|---|---|---|---|
| | LD$_{50}$ (mice) | Surface (related to Cocaine as 1) | Injection (related to Procaine as 1) |
| C—N(n—C$_6$H$_{13}$)$_2$, NH | 58 | 27 | 33 |
| NH, C—N(n—C$_4$H$_9$)$_2$ | 32 | 76 | 4 |
| OCH$_2$CH$_2$CH$_2$CH$_3$, Cl, NH, C—N(n—C$_6$H$_{13}$)$_2$ | 60 | 39 | 8 |

In practical application the amidines are preferably used in the form of their water soluble salts. The acid used to form the salt contributes nothing to the physiological activity of the substances and is not of a critical nature, provided it is not itself highly toxic. Hydrochloric acid, hydrobromic acid, sulfuric acid, phosphoric acid or organic acids such as malic acid, succinic acid, lactic aid or the like may be employed and any of these may offer advantages in individual cases but hitherto no other acid has been found preferable to hydrochloric acid. We therefore consider all non-toxic acids to be equivalent for this purpose and regard salts of this family of amidines with any such acid to be comprehended in the invention.

The following list of compounds, though not exhaustive, is believed to be representative of the physiologically active substituted amidines according to the present invention:

1. N,N-di-n-butyl-quinoline-4-carboxamidine.
2. N,N - di - n - amyl - quinoline - 4 - carboxamidine.
3. N,N - di - n - hexyl - quinoline - 4 - carboxamidine.
4. N,N - di - n - heptyl - quinoline - 4 - carboxamidine.
5. N,N - di - n - octyl - quinoline - 4 - carboxamidine.
6. N,N - di - n - butyl - 2 - n - butoxy - quinoline-4-carboxamidine.
7. N,N - di - n - hexyl - 6 - chloroquinoline-4-carboxamidine.

8. N,N - di - n - butyl - 6 - chloroquinoline-4-carboxamidine.

9. N,N - di-sec.butyl - 6 - chloroquinoline - 4-carboxamidine.

10. N,N - dicyclohexylquinoline - 4 - carboxamidine.

The compounds according to the present invention are conveniently prepared as described in our copending application Serial No. 700,366 above mentioned, by the reaction of a halomagnesium dialkylamide with the appropriate nitrile. The halomagnesium amide is formed by the addition of a secondary amine to a solution of a Grignard reagent, usually ethyl magnesium bromide. The sequence of reactions (which takes place in one operation) is:

(1) 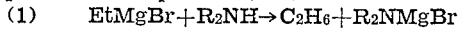

(2) 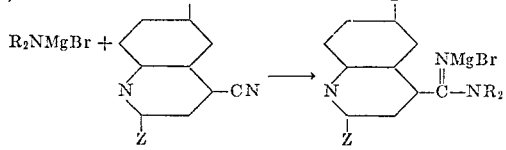

(3) 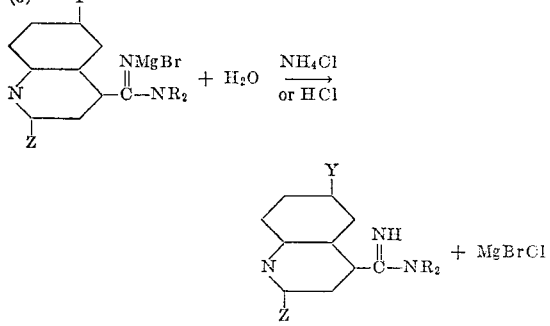

In effect then, the procedure is to prepare a solution of a Grignard reagent, preferably containing one to two equivalents (related to the nitrile that is to be employed) and add to it a slight excess of the requisite secondary amine (since Grignard reagents are not formed from the starting materials in quite quantitative yields, it is sufficient to employ an amount of secondary amine exactly equivalent to the magnesium or alkyl halide (whichever is not in excess)). The solution is refluxed 15–30 minutes to complete reaction 1 and the nitrile is then added at a rate such as to sustain gentle refluxing. The reaction mixture is then refluxed ½–4 hours further and decomposed by pouring into ice-water containing either ammonium chloride or hydrochloric acid (step 3). When ammonium chloride solution is used (as is preferred) the amidine base usually separates either as an oil or as a solid and can be separated by solvent-extraction or filtration, as the case may be. The amidine base is conveniently dried and transformed to a suitable salt (usually the hydrochloride).

Methods for the preparation of the substituted amidines according to the present invention are illustratively exemplified in the following examples which, however, are not intended to limit the scope of the invention:

EXAMPLE 1

*N,N-diethyl-quinoline-4-carboxamidine*

One-tenth mole (15.4 g.) of 4-cyanoquinoline was added to an ethereal solution of bromomagnesium diethylamine. The mixture was refluxed two hours and decomposed with ice and hydrochloric acid, only enough acid being used to give a final pH of 4. The solution was steam distilled whereby diethylamine and unreacted cyanoquinoline were removed. The residual solution was then cooled and made strongly alkaline. The amidine base was taken into ether, dried over potassium carbonate and transformed to the mono hydrochloride by addition of alcoholic hydrogen chloride until the solution was barely acid to Congo paper. The N,N-diethyl-quinoline-4-carboxamidine hydrochloride crystallized as a colorless solid.

EXAMPLE 2

*N,N-di-n-propyl-quinoline-4-carboxamidine*

A Grignard reagent was prepared from 10.8 g. (0.1 mole) of ethyl bromide and 2.5 g. (0.1 at. +) of magnesium. To this was added gradually a solution of 12 g. (0.12 mole) of di-n-propylamine in absolute ether and the resultant solution was refluxed ½ hour. There was then added slowly a solution in absolute ether of 7.7 g. (0.05 mole) of 4-cyanoquinoline and the whole was refluxed two hours further. The reaction-mixture was then poured into an excess of iced, saturated ammonium chloride solution. The ethereal layer was separated and the aqueous layer, after being made strongly alkaline, was extracted twice more with ether. The combined ethereal layers were evaporated and the residual oil (18 g.) was steam distilled to remove unreacted nitrile and secondary amine. The residual oil was taken into ether and extracted with successive 10 cc. portions of N-hydrochloric acid. When the current extract was found to be acid to Congo-red paper, the combined acid extracts were evaporated in vacuo leaving a colorless crystalline residue. The residue was recrystallized from absolute ethanol-ether mixtures giving 11.6 g. (85%) of pure N,N-di-n-propyl-quinoline-4-carboxamidine hydrochloride which melts at 266° (dec.). Other N,N-dialkyl - quinoline - 4 - carboxamidines were prepared by the same procedure using the corresponding dialkylamines. In general these N,N-dialkyl-quinoline-4-carboxamidines may be represented by the following formula

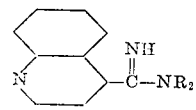

and the melting points of the hydrochlorides of some of these compounds are shown in the following table

| R | M. P. of hydrochloride |
|---|---|
| Ethyl | 213.5° C. dec. |
| n-Propyl | 266° C. dec. |
| n-Butyl | 214° C. |
| n-Amyl | 151° C. |
| n-Hexyl | 159° C. |
| n-Heptyl | 154–5° C. |
| n-Octyl | 149° C. |

EXAMPLE 3

*N,N-di-n-butyl-2-n-butoxy-quinoline-4-carboxamidine*

To a solution of bromomagnesium di-n-butyl-amide prepared from 2.5 g. of magnesium, 10.8 g. of ethyl bromide and 14 g. of di-n-butylamine (as in Example 2) was added 11.6 g. of 2-butoxy-4-cyanoquinoline. The solution was refluxed two hours and the product isolated by the method of Example 2. There was isolated 15 g. (75%) of pure N,N-di-n-butyl-2-n-butoxyquinoline-4-carboxamidine hydrochloride melting at 199°.

EXAMPLE 4

*N,N-di-n-hexyl-6-chloroquinoline-4-carboxamidine*

To a Grignard reagent prepared from 2.5 g. of magnesium and 10.8 g. of ethylbromide was added 19 g. of di-n-hexylamine. The solution was refluxed ½ hour and 7.6 g. (0.04 mole) of 6-chloro-4-cyanoquinoline dissolved in benzene was admitted gradually. The reaction-mixture was refluxed five hours and poured into iced ammonium chloride solution. There precipitated a colorless solid which was the magnesium derivative of the desired amidine. This was filtered off, washed well with ether and shaken with dilute sodium hydroxide solution and ether. By this treatment, magnesium hydroxide precipitated and the amidine base passed into the ethereal layer. After drying the ethereal layer was acidified with ethanolic hydrogen chloride and the precipitated hydrochloride was recrystallized from ethylacetate-ether mixtures, M. P. 187°.

By the same procedure bromomagnesium di-n-butylamide reacted with 6-chloro-4-cyanoquinoline to give N,N-di-n-butyl-6-chloroquinoline-4-carboxamidine and with 6-methoxy-4-cyanoquinoline to give N,N-di-n-butyl-6-methoxyquinoline-4-carboxamidine.

We claim:
1. A compound selected from the group consisting of the N,N-disubstituted-quinoline-4-carboxamidines of the type represented by the formula

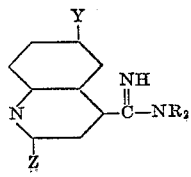

in which R is a member of the group consisting of the alkyl radicals and the cycloalkyl radicals having from 2 to 8 carbon atoms, Y is a member of the group consisting of hydrogen and chlorine and Z is a member of the group consisting of hydrogen and the alkoxy radicals containing from 1 to 4 carbon atoms, at least one of the groups Y and Z being hydrogen, and the entire compound containing from 14 to 26 carbon atoms, and the water soluble salts of such amidines with non-toxic acids.

2. N,N - dialkyl-quinoline - 4 - carboxamidines containing from 2 to 8 carbon atoms in each alkyl group.

3. N,N-di-n-hexyl-quinoline-4-carboxamidine.

4. N,N - di - n - butyl-2-n-butoxy-quinoline-4-carboxamidine.

RICHARD BALTZLY.
EMIL LORZ.

REFERENCES CITED

The following references are of record in the file of this patent:

UNITED STATES PATENTS

| Number | Name | Date |
|---|---|---|
| 2,049,582 | Ziegler | Aug. 4, 1936 |
| 2,450,386 | Short et al. | Sept. 28, 1948 |

OTHER REFERENCES

Barber et al.: J. Am. Chem. Soc., vol. 66, p. 1607 (1944).